United States Patent [19]

Maxwell et al.

[11] Patent Number: 5,533,156
[45] Date of Patent: Jul. 2, 1996

[54] INTEGRATED OPITCAL FIBRE AND SUBSTRATE SUPPORTED OPTICAL WAVEGUIDE HAVING DIRECTLY CONNECTED OPTICAL CORES

[75] Inventors: Graeme D. Maxwell; Benjamin J. Ainslie, both of Suffolk, England

[73] Assignee: British Telecommunications, plc, London, United Kingdom

[21] Appl. No.: 440,460

[22] Filed: May 12, 1995

Related U.S. Application Data

[63] Continuation of Ser. No. 50,358, filed as PCT/GB91/01932, Aug. 10, 1993, Pat. No. 5,465,312.

[30] Foreign Application Priority Data

Nov. 5, 1990 [GB] United Kingdom .................. 9024022

[51] Int. Cl.[6] ........................................................ G02B 6/30
[52] U.S. Cl. ................................. 385/49; 385/14; 65/386
[58] Field of Search ............................... 385/49, 50, 51, 385/65, 63, 83, 95, 96, 97, 98, 99

[56] References Cited

U.S. PATENT DOCUMENTS

| 5,046,809 | 9/1991 | Stein | 385/15 |
| 5,077,818 | 12/1991 | Stein | 385/51 |

FOREIGN PATENT DOCUMENTS

| 56-146107 | 11/1981 | Japan | 385/49 |

*Primary Examiner*—John Ngo
*Attorney, Agent, or Firm*—Nixon & Vanderhye

[57] ABSTRACT

A planar waveguiding device has the cores of fibre tails directly connected to the path regions of the waveguiding structure. The devices are produced by attaching the fibre tails before the path layer is deposited. The direct connections are produced when the path layer is sintered.

8 Claims, 2 Drawing Sheets

## INTEGRATED OPITCAL FIBRE AND SUBSTRATE SUPPORTED OPTICAL WAVEGUIDE HAVING DIRECTLY CONNECTED OPTICAL CORES

This is a continuation of Ser. No. 08/050,358, filed as PCT/GB91/01932, Aug. 10, 1993, now U.S. Pat. No. 5,465,312.

BACKGROUND OF THE INVENTION

1. Field of the Invention

This invention relates to waveguiding structures and, in particular, to structures in which path regions and confining regions are supported on a primary substrate.

2. Related Art

There may be many path regions in a waveguiding structure and complicated path regions are known, eg. in the case of optical switches in which radiation can be transferred from one path to another.

A known form of waveguiding structure comprises a primary substrate on which waveguides are fabricated by depositing waveguide material into grooves in the substrate. In order to facilitate connection between the waveguides and optical fibres, the waveguide material in each groove stops short of an edge of the structure and the ends of the fibres are mounted in the grooves where there is no waveguide material, the core of each fibre then being optically coupled to a waveguide in end-to-end fashion. Such an arrangement is disclosed in "Optical Coupling from Fibers to Channel Waveguides Formed on Silicon" by J. T. Boyd and S. Sriram, published in APPLIED OPTICS, 17 (6), 15th Mar. 1978.

In the arrangement disclosed, the waveguide comprises a polymeric plastics material, polyurethane, which is deposited from solution into the groove. It is clearly useful if connection between a fibre and a waveguide is physically robust. In this case, the polyurethane can also serve as an adhesive to secure the fibre in place.

It is preferable, however, if the materials in which optical components are fabricated are of the same material system. This, inter alia, facilitates fabrication. Since waveguiding structures are advantageously based on silicon, for instance, so that they can be integrated with devices, it would be advantageous to avoid the use of plastics materials as the waveguide material, and instead to use silicon based waveguide material.

It has been realised, in making the present invention, that it is possible to use waveguide material having a structure coupled to an optical fibre or fibre tail, while still obtaining a sufficiently robust component for practical application which is also relatively easy to fabricate.

A waveguiding structure based on a silica waveguide coupled to a fibre is disclosed in "Fusion Splicing between Deposited Silica Waveguides and Optical Fibers" by N. Shimizu, published in ELECTRONICS AND COMMUNICATIONS IN JAPAN, September 1984, No. 9. In this disclosure, mechanical robustness and low coupling loss are obtained by fusion splicing the fibre to the waveguide. However, the assembly process is complicated by the alignment procedure, for aligning the fibre and the waveguide, which relies on optimisation of transmitted power prior to the fusion splicing step.

BRIEF SUMMARY OF THE INVENTION

According to a first aspect of the present invention, there is provided an optical device comprising; (a) a primary substrate for mechanical support, (b) an optical waveguiding structure which is supported on said substrate and which waveguiding structure comprises at least one optically waveguiding path region the materials of which have a glass structure, (c) at least one fibre tail or fibre end portion which; (c1) is located between two layers of the waveguiding structure, (c2) is fully integrated into the waveguiding structure and secured therein by material having a glass structure, (c3) is directly connected to one of said path regions, (c4) is aligned with at least the end portion of the path region to which it is directly connected, and (c5) extends beyond the edge of the substrate.

The invention is more fully defined in the claims.

Surprisingly, although glass structure materials do not generally have physically robust characteristics, optical devices according to embodiments of the present invention have acceptable mechanical strength. By installing the end portion of a fibre, or a fibre tail, in a groove extending to the edge of the substrate, it is particularly easy to put down the materials of the path region associated with that groove such that at least the end portion of that path region is aligned with the end portion of the fibre or fibre tail. Further, by depositing the material of the path region in a fabrication step subsequent to putting the end portion of the fibre or fibre tail in the groove, the material of the path region develops against the end face of the fibre or fibre tail end portion, making a potentially excellent optical connection therewith. This arrangement can also provide useful tolerance in the longitudinal positioning of the end portion of the fibre or fibre tail in the groove.

By using a fibre tail instead of a whole fibre, the fabrication of optical devices according to the present invention is made relatively simple. If the fibre tail has a length such that it can be seated in the groove with a portion extending therefrom, the weight of the fibre tail holding it in place in the groove, then the primary substrate can be inserted together with its fibre tail or tails into the deposition environment for production of the optical waveguiding structure. This has the advantage that the material used to produce the optical waveguiding structure may also be the material used to secure the end portion of the fibre or fibre tail in the groove, being put down in the same deposition step with subsequent etching to determine the path region or regions.

Embodiments of the present invention have the characteristic of relatively easy fabrication since the materials used during fabrication belong to the same materials system. In addition, it has been realised that the path regions can be defined according to standard photolithographic techniques and are not affected by the dimensions of the groove produced to secure the fibre or fibre tails.

According to a second aspect of the present invention, there is provided a method of making a device according to the first aspect of the present invention, which method comprises locating an end portion of a fibre or fibre tail on a wafer which is the precursor of the device and thereafter depositing a path layer on the wafer and shaping the path layer to form the path regions, and to form means which secure, or contribute to securing, said end portion in relation to the wafer.

In embodiments of the present invention, the primary substrate might be silicon (Si) with the waveguiding structure formed of silica ($SiO_2$) with dopants to confer desired properties. Examples of dopants include germania ($GeO_2$) to increase the refractive index of path regions, and melting point depressants, eg. phosphorus and boron, to facilitate processing.

These waveguiding structures can be made by well-known techniques such as deposition, sintering, photolithography, etching and ablation. Suitable deposition techniques for use with silica waveguiding structures include flame-hydrolysis and plasma enhanced chemical vapour deposition.

Using these techniques, it is relatively simple to create a waveguide on the waveguiding structure which is extremely well optically coupled to the core of an optical fibre or fibre tail. Because the dimensions of the waveguide can be selected entirely independently of the dimensions of the groove in which an optical fibre or fibre tail is seated, a waveguide can be fabricated relatively simply to match the dimensions of the fibre core and thus to present an effective single mode coupling. (It might be noted that single mode fibres might have a core diameter of the order of 8 microns where the cladding diameter is of the order of 125 microns.)

Virtually (or actually) interface-free optical coupling can be achieved between the material of the waveguide and the core of the fibre tail since identical, or substantially identical, materials can be used, the material of the waveguide being "grown into" the material of the optical fibre tail core.

Even though a further connection will have to be made where a fibre tail is used, in order to attach a waveguiding path region to a full length optical fibre and/or to other components, techniques are known for connecting fibres to each other and to other components which produce very low loss connections and this is not therefore a practical problem.

Such other components might be for instance lasers, detectors or modulators.

It might be convenient to prepare a plurality of devices using a single substrate. When processing is complete the substrate is sawn in order to release the individual devices.

BRIEF DESCRIPTION OF THE DRAWINGS

The invention will now be described by way of example with reference to the accompanying drawings in which.

DETAILED DESCRIPTION OF EXEMPLARY EMBODIMENTS

Figure 1:
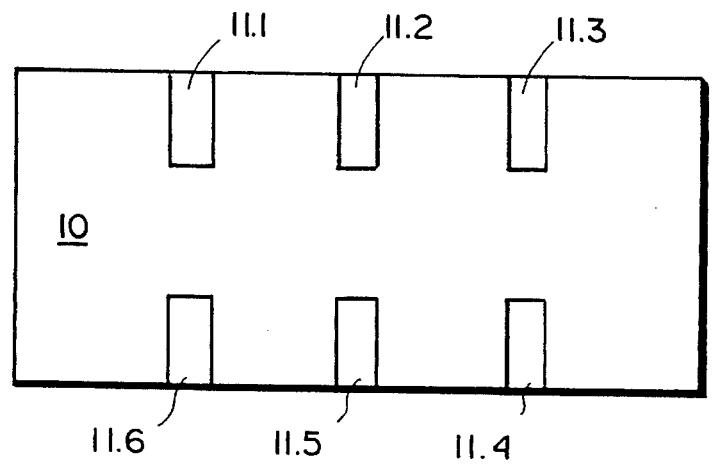
FIG. 1 is a plan view illustrating a wafer having grooves to receive fibre tails.

The processes used in the examples include:

(a) flame hydrolysis to deposit porous layers, (b) sintering to consolidate the porous layers to glassy layers, and (c) photolithography to make defined patterns.

Each of these steps is well known in its own right but brief descriptions are provided to identify important points.

Flame hydrolysis is carried out using a deposition apparatus including a horizontal turntable with a diameter of about 500 to 1000 mm and which rotates at about 1 revolution per second. The apparatus also includes an oxyhydrogen torch which traverses in and out along one radius. The temperature in the hottest part of the flame is probably about 2000° C. but the torch usually heats the turntable and any wafers lying thereon to about 200°–400° C.

To produce a deposit, volatile reactants are introduced into the gas supply to the torch and, under the conditions prevailing in the flame, these reactants are converted to fine particles of oxides which are usually known as "soot". The soot deposits as a porous layer on wafers lying on the turntable (and on anything else which happens to be in the vicinity). To make a path region, $SiCl$, and $GeCl$, are introduced into the flame whereby the soot consists of an intimate mixture of $SiO_2$ and $GeO_2$. To make a confining region, $SiCl_2$ together with a dopant such as $PCl_3$ or $BCl_3$ are introduced into the flame. In this case the soot consists of $SiO_2$ with a melting point depressant.

To deposit a layer, the turntable is heated to working temperature using an oxyhydrogen flame or integral heater element beneath the turntable without any reagents. The wafers are placed on the heated turntable and they rapidly achieve working temperature because the mass of the wafer is small. Deposition then takes place as described above.

After deposition the wafers are placed in a furnace at a temperature of about 1350° C. for sintering. This temperature is chosen as the incipient melting temperature of the materials of the wafer. That is, the materials begin to melt but the temperature is too low for them to become fully fluid. Under the selected conditions the particles of soot coalesce into a single clear glass layer, partly under the influence of their own surface tension. However, the duration of sintering is too short for any noticeable flow to take place and components such as fibres retain their configuration throughout sintering although they will fuse to a layer of soot with which they are in contact.

The photolithography according to the invention uses two masks each of which is accurately dimensioned in relation to the other. This ensures that the features produced by each of the two masks are in the correct relative positions for very accurate connections.

The sequence of operations will now be explained with reference to the drawings. The process starts with wafers which are readily available commercially and each wafer consists of a primary substrate about 0.5 to 1 mm thick with a buffer layer about 10–15 microns thick. The primary substrate is made of Si and the buffer layer, which is made of $SiO_2$, was obtained by oxidising the surface of a silicon wafer. The primary substrate is required to give mechanical strength and it has no effect on the optical properties of the waveguiding structure. (The thickness of the silicon layer is in practice substantially greater than as indicated in the drawings.)

Because fibre tails are to be attached around the edge of a wafer, it may be convenient to cut a large wafer into smaller segments before processing starts. This does not accord with conventional practice but it is not substantially more difficult to process a plurality of small wafers rather than one large wafer.

As the first stage of production, a wafer is cut into rectangular segments and the grooves formed using photolithography followed by wet or dry etching. Depending on the etching techniques used, the grooves may have different cross-sections. This is discussed further below. In the embodiment being described here, the grooves have "V" cross-sections.

A first mask is used to control the etching so as to produce the configuration shown in FIG. 1. This Figure shows a wafer 10 as described above with six grooves 11.1 to 11.6 etched around the edge. The location, width and length of each of these grooves is accurately determined by the first mask, according to known techniques. The depth of the grooves can also be accurately determined, by controlling the etching process.

Figure 2:
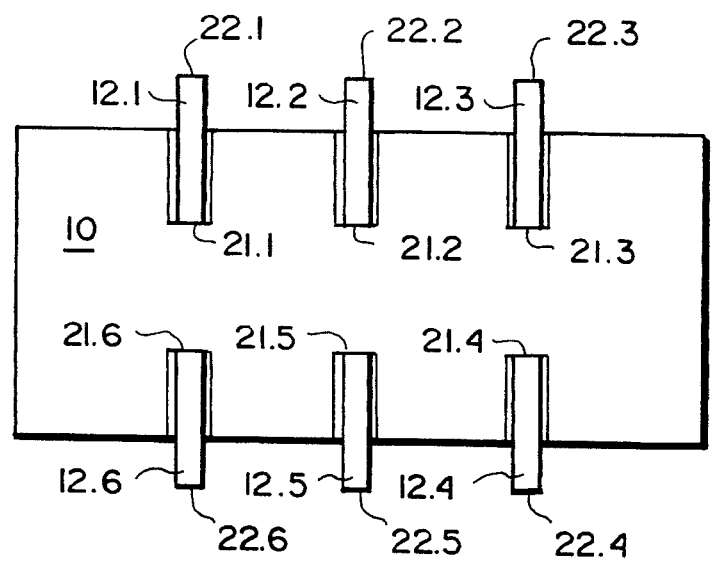
FIG. 2 illustrates fibre tails in the grooves shown in FIG. 1.

Having etched the grooves, the next step in the process is to place a fibre tail 12.1 to 12.6 in each of the grooves 11.1 to 11.6 to produce the configuration shown in FIG. 2. The fibre tails have inward ends 21.1 to 21.6 and outward ends 22.1 to 22.6.

It should be noticed that the dimensions of each groove are selected so that each fibre tail is accurately positioned in height by its own groove. It is desirable that the length of fibre in the groove should be greater than the tail extending from the groove to ensure mechanical stability during the next stage of processing.

Figure 3:
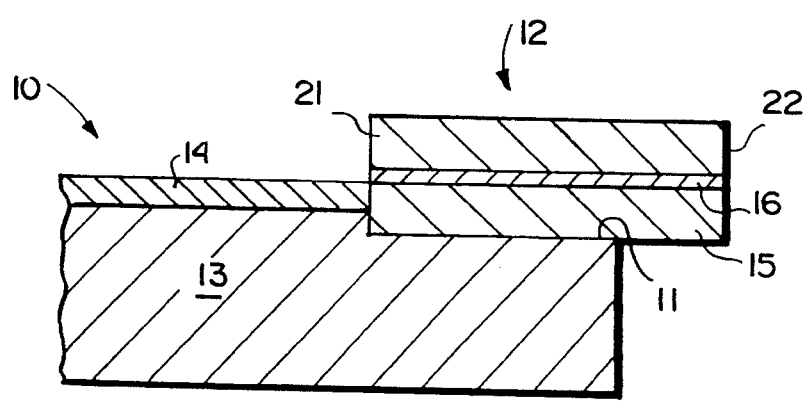
FIG. 3 is a vertical cross-section through any one of the grooves and fibres shown in FIG. 2.

FIG. 3 is a vertical cross-section which applies to each of the fibre tails in each of the grooves. In FIG. 3 the fibre tail is generally indicated by the numeral 12 and the groove by the numeral 11. The wafer 10 consists of the primary substrate 13 (thicker than suggested in the drawings) and the buffer layer 14. It will be noted that the groove 11 extends through the buffer layer 14 and into the primary substrate 13. It can be seen that the fibre 12 has a cladding 15 which is about 60 microns thick and the groove is etched to a depth of 60 microns so that the bottom of the core 16 is level with the top of the silica layer 14. The core 16 has a diameter of about 6–8 microns.

The wafer 10, with fibre tails located as shown in FIG. 3, and end face of each fibre tail being butted against the blind end of its associated groove, is placed in the deposition apparatus for the deposition of a silica/germania layer using the technique described above. It will be appreciated that, during the deposition, the soot will deposit all over the substrate, all over the fibre and in any crevices. Each fibre tail is accurately located by its groove but the longitudinal location may be slightly less accurate than the lateral. This is because the soot tends to fill any space, making the arrangement somewhat tolerant of the longitudinal position of the fibre tails.

The silica/germania layer is then sintered. During the sintering process the silica/germania soot consolidates into a thin glass layer which completely covers the wafer and which acts as an adhesive to secure the fibre into its groove. In addition, because the layer covers the whole surface, whatever the longitudinal location of the fibre the layer tends to become fused to the core 16 at each inward fibre end 21.

As mentioned above, the sintering process can bring the core to incipient melting but the structure of the fibre is not affected. Nevertheless incipient melting ensures an excellent optical joint between each core and the newly deposited path layer.

After sintering the silica/germania layer, a photolithographic etching process is carried out under the control of a second mask. Because the second mask is accurately dimensioned in relation to the first mask, the second mask can be accurately located so as to leave a desired pattern of path regions 17.1 to 17.3 interconnecting with the fibre tails.

Figure 4:
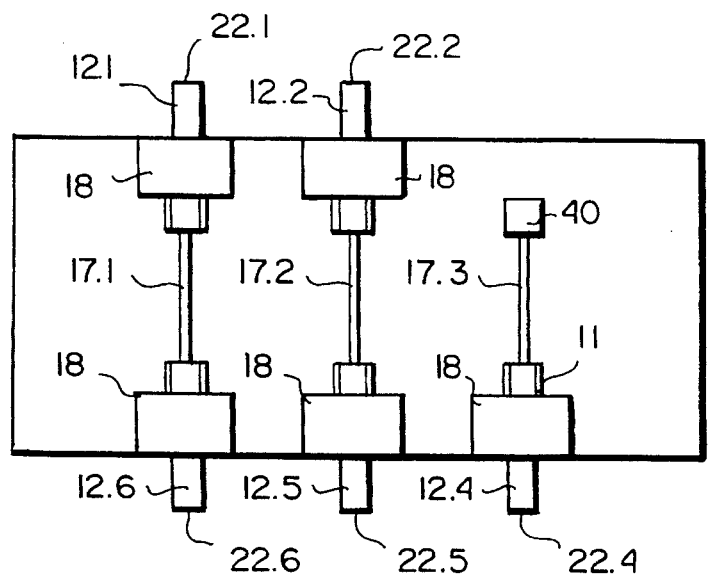
FIG. 4 is a plan view showing the surface of the wafer after the deposition and etching of a path layer.

Referring to FIG. 4, an area 18 of the silica/germania layer is also left over each fibre tail 12.1 to 12.6, to act as securing means. It will be appreciated that this material extends all around the fibre and into the groove whereby it acts as an adhesive which firmly secures the fibre in the groove. Also in FIG. 4, the path regions 17.1, 17.2 and 17.3 can be seen which interconnect the fibre tails 12.1 to 12.6.

Figure 5:
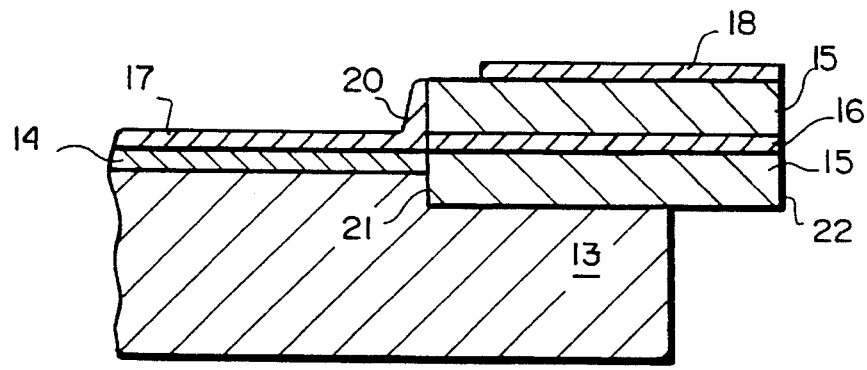
FIG. 5 is a vertical cross-section corresponding to FIG. 3 after the preparation of the path region.

In FIG. 5, it can be seen that, at the inward end 21, the core 16 of each fibre 12 becomes directly fused to a deposited path region 17. FIG. 5 also shows how material 20 from the silica/germania layer deposits on the inward end 21 of each fibre tail 12 but this generally does not significantly affect the optical coupling in use of a waveguiding structure according to an embodiment of the present invention.

Ideally, the chemical composition should be selected so that the core 16 has exactly the same chemical composition as the associated deposited path region 17. Thus the fusion between core 16 and path region 17 creates an excellent optical connection with no material interface to cause reflection.

Figure 6:
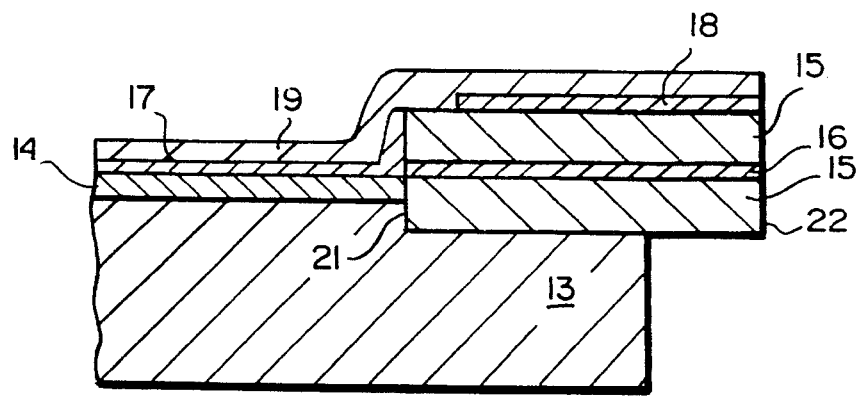
FIG. 6 is a vertical cross-section corresponding to FIG. 5 after the deposition of the final confining layer.

The wafer is returned to the deposition apparatus for the deposition of a final confining layer 19, which layer 19 is also sintered. Referring to FIG. 6, the final layer 19 extends everywhere over the substrate 10, including above the fibre tails and the pathways 17. FIG. 6 also shows that the final layer 19 is fused to the cladding 15 of the fibre 12 and extends between the path regions 17 where it contacts the buffer layer 14. Thus the final layer 19 co-operates with the buffer layer 14 to surround each path region 17 whereby the buffer and final layers 14, 19 constitute cladding serving as the confining region of the waveguide structure.

FIG. 6 emphasises that each fibre tail becomes fully integrated into the deposited waveguiding structure so that excellent, low-loss connections are achieved. When the time comes, it is easy to make external connections for instance by fusion welding connection fibres onto the outward ends 22.

The process of the present invention, in which the fibre tails are located on the wafer before the path region layer is deposited, is much easier to operate and gives better results than the conventional method in which the fibre tails are attached last. In accordance with the invention, the fibre tails are accurately located because the grooves and the path regions are produced by compatible masks which control very accurate photolithographic processes. Errors of the location of the fibres in the grooves are relatively unimportant because the deposition processes are such that material is deposited everywhere and hence good connections to the fibres are achieved. Furthermore, in the preferred embodiment of the invention, the optical connections are formed by the direct welding of identical materials to one another and this is the best arrangement for achieving low-loss connections.

It will be appreciated that many variants upon the above exemplified process are possible. Some of these variants will now be identified.

As described above, it is convenient to begin the process with a primary substrate coated with thin buffer layers. It is also possible to begin with the uncoated primary substrate in which case an extra deposition stage is required to provide the buffer layer. Conveniently, and preferably, this first deposition could be the same as the deposition of the final confining layer. The deposition of the buffer layer means that layers of any thickness can be used, e.g. layers which are the same thickness as the cladding of the fibre (i.e. 60 microns in the above example). The deposition of the buffer layer gives rise to an extra alternative, namely that the grooves are etched and that the fibre tails placed therein before the deposition of the buffer layer.

It will also be appreciated that there are many processes suitable for the deposition of the layers. Thus, instead of flame hydrolysis as described above, the following deposition techniques could be used:

(a) Plasma enhanced chemical vapour deposition (PECVD),
(b) Sol-gel processing,
(c) Low Pressure Chemical Vapour Deposition (LPCVD),
(d) Radio Frequency Sputtering,
(e) Ion Beam Deposition.

Similarly shaping techniques other than photolithography can be used, e.g. techniques, such as ablation with an excimer laser or mechanical techniques such as sawing. These techniques do not use masks.

When masks are used, e.g. photolithography, the etching can be carried out using wet techniques, e.g. aqueous KOH, or dry techniques such as ion beam milling or reactive ion etching (RIE).

The technique used to remove unwanted material affects the shape of the groove. For example, in wet techniques the rate of removal depends on crystal orientation and V-grooves are obtained. Dry removal techniques tend to give more rectangular grooves. However, provided the dimensions are accurate, the cross-sectional shape is not important. Thus V-shaped grooves can be used and grooves which are curved to the shape of the fibre are also appropriate. It should be emphasised that it is possible to support a fibre accurately and leave small gaps at the surface. These gaps will be filled by the deposited material so that they will not be left in the final product. There is also a tendency for the fibre tails to become securely welded into the grooves as a natural consequence of the deposition process.

In most cases the wedging effect of the fibre in the groove is sufficient to hold the fibre during the deposition process but additional security can be provided by temporary mechanical restraints, e.g. silicon masses placed on the outer extremities of the groove. It would usually be appropriate to remove the mechanical restraints after the first deposition process.

Although the structure described above and generally as shown in the Figures comprises a wafer with a symmetrical array of fibre tails and path regions, in practice it is unlikely such an array would be appropriate. There may be one or more fibre tails per structure and fibre tails may be coupled by an associated path region to a device, for instance a passive or active device 40 (as shown in FIG. 4), rather than to another fibre tail. It is in this type of application, in an integrated device arrangement, that the use of silica as the waveguiding material is particularly advantageous since the same material might be used to fabricate the device as to fabricate the waveguide.

One or more path regions may not be straight or one path region may divide so that for instance one fibre tail is coupled to more than one device, or one device to more than one fibre tail.

We claim:

1. An optical device comprising:
   (a) a primary substrate for mechanical support,
   (b) an optical waveguiding structure which is supported on said substrate and which waveguiding structure comprises confining regions having a glass structure comprising silica and at least one optically waveguiding path region the materials of which have a glass structure comprising silica with germania to increase the refractive index,
   (c) at least one optical fibre having a core surrounded by a cladding wherein the core has a glass structure comprising silica with germania to increase the refractive index and the cladding has a glass structure comprising silica, wherein the end portion
      (c1) is located between two layers of the waveguiding structure,
      (c2) is fully integrated into the waveguiding structure and secured therein by material having a glass structure,
      (c3) has the core directly connected by fusion to one of said path regions,
      (c4) is aligned with at least the end portion of the path region to which its core is directly connected, and
      (c5) extends beyond the edge of the substrate.

2. A device according to claim 1 wherein the silica glass structures of the at least one path region and the at least one fibre core are of substantially the same material and the silica with germania glass structures of said confining regions and said cladding are of substantially the same material.

3. A device according to claim 1 wherein the device comprises a fibre end portion more than half the length of which is fully integrated into the waveguiding structure.

4. A device according to claim 1 which comprises a plurality of fibre end portions, each fully integrated into the waveguiding structure.

5. A device according to claim 1 wherein the optical fibre is secured in the waveguiding structure by a material having a glass structure comprising silica and germania.

6. A device according to claim 1 in which the primary substrate is made of silicon.

7. A method of making a device comprising:
   (a) a primary substrate for mechanical support,
   (b) an optical waveguiding structure which is supported on said substrate and which waveguiding structure comprises at least one optically waveguiding path region the materials of which have a glass structure,
   (c) at least one fibre tail or fibre end portion directly connected to one of said path regions, which method comprises:
      (i) locating the inward end of a fibre or fibre tail on said substrate leaving the outward end extending therefrom; and
      (ii) depositing a path layer on said substrate and sintering said layer to produce direct connections between the layer and the core of the end of the fibre or fibre tail.

8. An optical device made by the method of claim 7.

* * * * *